Oct. 23, 1956     I. J. GRUENBERG     2,767,881
APPARATUS FOR SIMILARLY ORIENTING IN LONGITUDINALLY ALIGNED
SERIES LIKE PRISMATIC BODIES OF NON-SYMMETRICAL
CROSS-SECTIONAL CONTOUR
Filed Nov. 23, 1953
FIG.5.
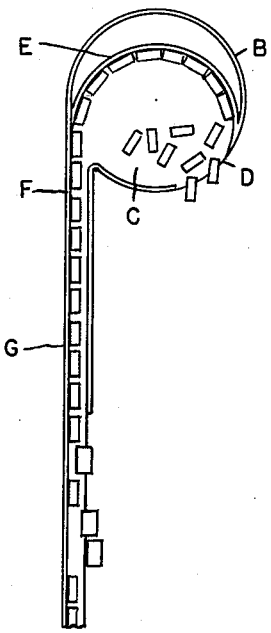
FIG.1.
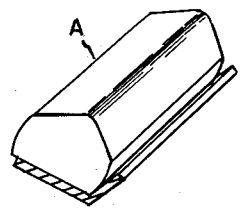
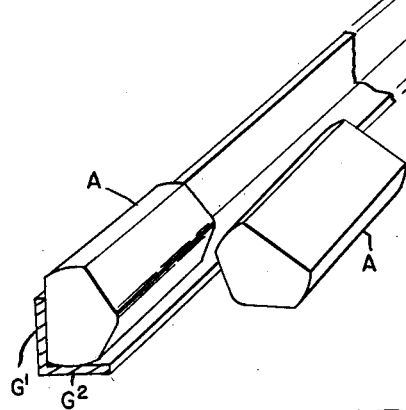
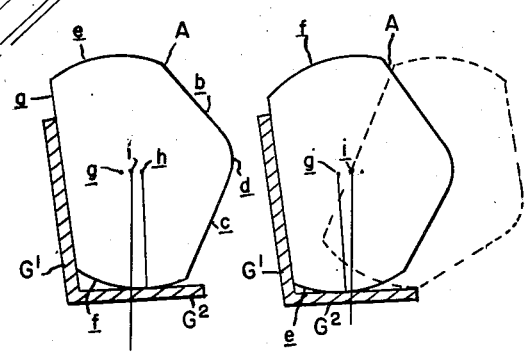
FIG.2.     FIG.3.
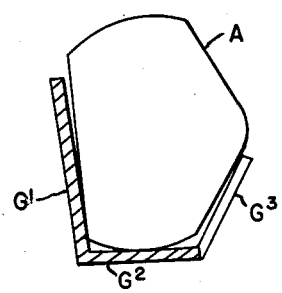
FIG.4.
*INVENTOR.*
IVOR J. GRUENBERG
*BY*
ATTORNEYS

United States Patent Office 2,767,881
Patented Oct. 23, 1956

2,767,881

APPARATUS FOR SIMILARLY ORIENTING IN LONGITUDINALLY ALIGNED SERIES LIKE PRISMATIC BODIES OF NON-SYMMETRICAL CROSS-SECTIONAL CONTOUR

Ivor J. Gruenberg, Clarkston, Mich., assignor to The Gear Grinding Machine Company, Detroit, Mich., a corporation of Delaware Application November 23, 1953, Serial No. 393,574

1 Claim. (Cl. 221—157)

The invention relates to apparatus for orienting prismatic bodies of non-symmetrical cross-sectional contour and is a continuation-in-part of my pending application for patent, Serial No. 68,884, filed January 3, 1949.

The invention has more particular reference to the orienting of prismatic sprags which are used in one-way clutches. These sprags have non-concentric cam faces on diametrical opposite sides thereof which in the one-way clutch are in series between spaced concentric cylindrical raceways, respectively on the driving and the driven members of the clutch. It is absolutely essential that all of the sprags should be similarly oriented as otherwise they would interfere with each other and render the clutch unoperative. It is, however, possible to orient the sprags of the series in several different ways, as for instance, reversal from end to end and reversal of the cam faces in relation to the inner and outer raceways. Improper orientation is not easily detected by eye, particularly where the sprags are of small dimensions, and it is therefore very important that some means should be provided for insuring like orientation of all.

The method which I employ in orienting the sprags or other non-symmetrical prismatic bodies involves two steps, one, the arrangement of the prismatic bodies in longitudinally aligned slightly spaced series, and second, in eliminating from the series all members which are not of a particular orientation. The apparatus for performing the first step is not a part of the instant invention but will be diagrammatically illustrated. The apparatus for performing the second step constitutes the subject matter of the instant invention and broadly consists in an inclined guideway over which the series of slightly spaced longitudinally aligned prismatic bodies are advanced by gravitation but on which only those of a particular orientation are stable so that those of other orientations are unstable and will fall out from the series. The invention further consists in a more specific construction as hereinafter set forth and shown in the accompanying drawings, in which:

Fig. 1 is a perspective view of a portion of the apparatus including the inclined guideway along which the series of longitudinally aligned prismatic bodies is advanced;

Fig. 2 is a cross-section through a portion of said guideway showing a prismatic body oriented to be stably supported thereon;

Fig. 3 is a similar view showing a prismatic body oriented to be unstable so that it will fall out of the series;

Fig. 4 is a cross-section through a guideway modified in construction to have a portion for directing all of the prismatic bodies to the portion differentiating between different orientations;

Fig. 5 is a plan view diagrammatically illustrating one means for forming the series of longitudinally aligned spaced prismatic bodies and directing the same to the differentiating guideway.

Prismatic bodies forming sprags for one-way clutches vary in construction but I have illustrated one specific construction A, as follows:

One side $a$ of the prismatic body is a plane which is of greater width than any other side. Sides $b$ and $c$ are at opposite oblique angles to the side $a$ and are connected by a rounded nose portion $d$. The portions $e$ and $f$ of the contour are cams extending, respectively, between the sides $a$ and $b$ and sides $a$ and $c$. These cams are preferably arcs of circles with respective centers $g$ and $h$. $i$ is the center of gravity.

The sprags A may be formed from bars drawn or otherwise formed of the desired cross-sectional contour and severed into suitable sprag lengths. As the sprags thus formed must be heat treated they lose their original orientation. The first step in reorienting the sprags is to arrange them in longitudinally aligned slightly spaced series. As above stated the specific means for performing this step forms no part of the instant invention. However, Fig. 5 diagrammatically illustrates one form of apparatus for aligning the sprags comprising a circular receptacle B having a rotating conical bottom C on one portion of which the sprags are deposited to be moved radially outward by centrifugal action against the wall of the receptacle in alignment with each other. Any of the sprags which fail to thus align will slide down the conical wall and escape through an opening D in the receptacle. The aligned sprags are advanced by the rotation of the bottom C and are directed against a wall portion E which first extends from the outer wall to a point nearer the center of the cone and then returns to the circle of the outer wall. This has the effect of slowing the advancement of the aligned sprags while they are travelling towards the center of the cone and of later accelerating them as they travel towards the outer periphery, this latter movement causing them to separate slightly from each other at their adjacent ends. The sprags are tangentially discharged through a chute F onto an inclined guideway G.

As shown in Fig. 1 the guideway G is of angle cross-section having the portions thereof G' and G². At the point where the sprags are first deposited on the guideway, the portions G' and G² are at such angles to the vertical that the sides $a$ of the sprag will rest upon the portion G'. Beyond this point the guideway is twisted so that the portion G' exends in a generally vertical direction and the portion G² in a generally horizontal direction. However, this latter portion of the guideway is in such relation to the vertical that the sprags in one orientation will be stably supported thereon, while those of other orientation will be unstable and will roll off of the portion G² at the open side theerof. This is illustrated in Figs. 2 and 3. In Fig. 2 the cam face $f$ rests upon the portion G² of the guideway and it will be noted that the point of tangency or bearing on the portion G² is to the right of a vertical line from the center of gravity $i$. This forms a stable support for one side of the sprag rests against the side G' of the guideway to the left of the center of gravity $i$, while the tangential bearing on the portion G² is to the right of the center of gravity. Consequently, as the supports for the sprag extend upon opposite sides of the center of gravity, said sprag will be in stable equilibrium and will continue to travel down the inclined guideway. In Fig. 3 the cam face $e$ contacts with the portion G² of the guideway and because of the location of the center of this cam portion the point of tangency will be to the left of a vertical line from the center of gravity $i$. This will constitute an unstable support as all points of support are on one side of the center of gravity, permitting the sprag to roll off at the open side of the guideway, as indicated in dotted lines. Thus, it will be understood that all of the sprags having the cam face *e* contacting the bottom $G^2$ of the guideway will be unstable and will fall out of the series and the fact that the sprags are spaced from each other in the series will prevent any one from being held by another. On the other hand all sprags having the cam face *f* in contact with the portion $G^2$ will be in stable equilibrium and will continue to slide down the guideway forming an aligned series in which all have the same orientation.

While, as shown in Fig. 1, all of the sprags travel down the upper portion of the guideway before it is twisted, as shown in the lower portion, this means of delivering the sprags is not necessary and it is unnecessary to twist the guideway. Another means of delivering all of the sprags from the centrifugal to the differentiating portion of the guideway is illustrated in Fig. 5. Here an opposite side $G^3$ extends along the upper portion of the guideway and holds all of the sprags thereon. The side $G^3$ is, however, cut away in the lower portion of the guideway, which permits all sprags in unstable orientation to roll off.

The stability or unstability of the sprags on the guideway is dependent primarily on the angles of the portions $G'$ and $G^2$ to the vertical. Thus, by turning the cross-section of the guideway, as shown in Figs. 2 and 3, in a counterclockwise direction a point will be reached where all of the sprags will be stable thereon regardless of the particular orientation. On the other hand, by turning the guideway in a clockwise direction a point will be reached where all of the sprags regardless of orientation will be unstable and will fall off the guideway. Thus, the cross-section of the guideway must be turned in such relation to the vertical that with the orientation of the sprag, as in Fig. 2, the center of gravity is to the left of the line of support on the bottom portion $G^2$, while with the orientation, as in Fig. 3, the center of gravity of the sprag is to the right of its line of support on said portion $G^2$. Generally speaking, with prismatic bodies of non-symmetrical cross-sectional contour the relation of the center of gravity to the point of support will differ in different orientations so that it is possible by rotating the support to render one orientation stable thereon while all others are unstable.

What I claim as my invention is:

Means for eliminating from a series of longitudinally aligned like prismatic bodies of non-symmetric cross sectional contour all members thereof other than those having a particular orientation; comprising a longitudinally inclined guideway along which said longitudinal series of prismatic bodies is advanced by gravitation, said guideway having a substantially rectilinear longitudinal axis and the cross-section of said guideway having a bottom and a bearing on one side only and being gradually twisted about its longitudinal axis to turn the bodies advancing thereover and shift the center of gravity thereof towards the open side until the unstable condition of all but those of selected orientation is attained so that they fall out from the series.

References Cited in the file of this patent
UNITED STATES PATENTS

| | | |
|---|---|---|
| 245,408 | Sheldon | Aug. 9, 1881 |
| 812,327 | Cranner | Feb. 13, 1906 |
| 917,629 | Long | Apr. 6, 1909 |
| 1,191,938 | Bazzoni | July 25, 1916 |
| 1,576,338 | Ladd | Mar. 9, 1926 |
| 2,385,951 | Stelzer | Oct. 2, 1945 |
| 2,667,797 | Buenger | Feb. 2, 1954 |

FOREIGN PATENTS

| | | |
|---|---|---|
| 772,590 | France | Nov. 2, 1934 |